United States Patent
McGee

(10) Patent No.: US 7,876,689 B2
(45) Date of Patent: Jan. 25, 2011

(54) METHOD AND APPARATUS FOR LOAD BALANCING NETWORK INTERFACE ADAPTERS BASED ON NETWORK INFORMATION

(75) Inventor: Michael Sean McGee, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 823 days.

(21) Appl. No.: 11/171,297

(22) Filed: Jun. 29, 2005

(65) Prior Publication Data

US 2007/0002738 A1    Jan. 4, 2007

(51) Int. Cl.
*H04L 12/26* (2006.01)

(52) U.S. Cl. ............... 370/238; 370/254; 370/351; 709/226

(58) Field of Classification Search ......... 370/216–218, 370/229, 232–235, 254–255, 351, 396, 395.4–395.41, 370/395.52, 395.54, 411, 414, 419; 709/223, 709/224, 225, 226

See application file for complete search history.

(56) References Cited

U.S. PATENT DOCUMENTS

| | | | |
|---|---|---|---|
| 6,032,194 A * | 2/2000 | Gai et al. ............... 709/239 |
| 6,052,733 A * | 4/2000 | Mahalingam et al. ....... 709/235 |
| 6,229,538 B1 | 5/2001 | McIntyre et al. |
| 6,243,360 B1 * | 6/2001 | Basilico ............... 370/231 |
| 6,314,525 B1 * | 11/2001 | Mahalingham et al. ........ 714/4 |
| 6,363,319 B1 * | 3/2002 | Hsu ............... 701/202 |
| 6,370,119 B1 * | 4/2002 | Basso et al. ............... 370/252 |
| 6,381,218 B1 | 4/2002 | McIntyre et al. |
| 6,535,491 B2 | 3/2003 | Gai et al. |
| 6,560,630 B1 * | 5/2003 | Vepa et al. ............... 718/105 |
| 6,578,086 B1 * | 6/2003 | Regan et al. ............... 709/242 |
| 6,636,499 B1 | 10/2003 | Dowling |
| 6,778,496 B1 * | 8/2004 | Meempat et al. ............ 370/230 |
| 6,898,183 B1 | 5/2005 | Garakani |
| 6,938,092 B2 | 8/2005 | Burns |
| 2001/0021177 A1 * | 9/2001 | Ishii ............... 370/256 |
| 2002/0159398 A1 * | 10/2002 | Yamada et al. ............... 370/256 |
| 2003/0140124 A1 | 7/2003 | Burns |
| 2003/0167346 A1 | 9/2003 | Craft et al. |
| 2004/0098501 A1 | 5/2004 | Finn |
| 2005/0063395 A1 | 3/2005 | Smith et al. |
| 2005/0066216 A1 | 3/2005 | Hebbar et al. |
| 2005/0080923 A1 | 4/2005 | Elzur |
| 2005/0188371 A1 | 8/2005 | Smith et al. |
| 2005/0259649 A1 | 11/2005 | Smith |

(Continued)

OTHER PUBLICATIONS

Hewlett-Packard, hp ProLiant network adapter teaming, technical white paper, Jun. 2003.

(Continued)

*Primary Examiner*—Aung S Moe
*Assistant Examiner*—Curtis A Alia

(57) ABSTRACT

A method and system for load balancing transmission allocations from a computer system based on network conditions. The system includes at least two network interface adapters that couple to a network and receive network information packets. The system also includes a teaming driver that monitors network information packets for each of the network interface adapters, calculates weights for each of the network interface adapters based on the network information packets and generates a transmission allocation for distributing outgoing packets between the network interface adapters based on the calculated weights.

23 Claims, 4 Drawing Sheets

U.S. PATENT DOCUMENTS

2006/0007869 A1 * 1/2006 Hirota et al. ................ 370/244

OTHER PUBLICATIONS

Broadcom NetXtreme Gigabit Ethernet Adapter User's Guide, Release: 2CS5700-UM202-R, Feb. 26, 2003, Version 6.6.x, 35 pages.
Cisco Software Configuration Guide, release 6.2, 490 pages
EtherChannel Between Catalyst Running CatOS, copyright 1992-2003, 14 pages.
Cisco Ethernet Technology, 7 pages.
Office Action, dated Feb. 20, 2008, U.S. Appl. No. 11/048,520, 18 pages.
Office Action, dated Jul. 11, 2008, U.S. Appl. No. 11/048,520, 20 pages.
Office Action, dated Jul. 22, 2009, U.S. Appl. No. 11/048,520, 13 pages.
Final Office Action, dated Dec. 18, 2008, U.S. Appl. No. 11/048,520, 25 pages.
Final Office Action, dated Jan. 21, 2010, U.S. Appl. No. 11/048,520, 15 pages.
Cisco Understanding EtherChannel Inconsistency Detection, 6 pages.

* cited by examiner

METHOD AND APPARATUS FOR LOAD BALANCING NETWORK INTERFACE ADAPTERS BASED ON NETWORK INFORMATION

CROSS-REFERENCE TO RELATED APPLICATION

The following commonly owned application is hereby incorporated by reference for all purposes:

U.S. patent application Ser. No. 11/048,520, filed Feb. 1, 2005, entitled "Automated Selection of an Optimal Path Between a Core Switch and Teamed Network Resources of a Computer System" by Michael Sean McGee, which claims benefit of U.S. Provisional Application Ser. No. 60/577,761, filed Jun. 7, 2004.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In processor-based systems, such as computer systems, it may be desirable for information to be transferred efficiently from one system to another system. Accordingly, a network may be utilized to allow information, such as files or programs, to be shared across an office, a building, or any geographic boundary. The use of the network may enhance productivity for various systems by allowing server systems having larger processing and storage capabilities to communicate with smaller systems, such as client systems, for example. That is, the server systems may store data for client systems and provide various functionalities, such as enhanced processing power, data storage and other similar functionalities, to the client systems.

Network interface resources may be used to couple computers and other devices to a network. These interface resources are generally referred to as network interface adapters. For example, network interface adapters may include network interface cards (NICs), each adapter or NIC having at least one port through which a physical link is provided between the network transmission medium and the processing resources of the network device. Data may be communicated from the processing resources of one network device to another through the network. The data is transmitted and received through these interface resources and over the media used to physically couple the devices together.

To improve the reliability and throughput of a network, some or all of the network devices may be coupled to the network through redundant network resources. These redundant links to the network may be provided as a plurality of single-port NICs, one or more NICs each having more than one port, or a combination thereof. Teaming of network interface resources is particularly common for servers, as the demand for throughput and reliability is typically greatest for servers on a network. Resource teams typically include two or more NICs (more specifically, two or more NIC ports) logically coupled in parallel to appear as a single virtual network adapter to the other devices on the network. These resource teams can provide aggregated throughput of data transmitted to and from the network device employing the team and/or fault tolerance (i.e. resource redundancy to increase reliability).

For a server system, one or more NICs may be utilized to provide improved access points to the network. However, in a network system having multiple NICs, the traffic load across the NICs may not be balanced. That is to say, that the traffic may be heavier through one data path and NIC than another which may degrade system performance. Further, the NICs in the system may be unable to compensate for different network conditions, such as network bandwidth bottlenecks and problems. As a result, the system may not operate efficiently because it is unable to adjust transmission allocations to compensate for network conditions which degrades the system's performance.

BRIEF DESCRIPTION OF THE DRAWINGS

Exemplary embodiments of the present invention may be apparent upon reading of the following detailed description with reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally, embodiments of the present invention may provide a methodology for operating multiple network interface adapters in a teaming environment. More specifically, the present embodiments provide a methodology for operating multiple network interface cards (NICs) in a teaming environment for a computer system, such as a server system. Because each of the NICs may be coupled to a different network port or may have a different configuration, the path cost for each of the NICs may vary based on the network access and the dynamic nature of the network environment. Beneficially, under the present techniques, teaming NICs may utilize network information relating to network conditions, such as spanning tree bridge protocol data unit (BPDU) frames, to dynamically adjust the allocation of transmission packets for each of the teaming NICs. This allocation assigns different weights to each NIC in the team of NICs based on the network conditions, which may be reflected in a path cost to the network core for each NIC. Based on this allocation, the transmission packets may be distributed between NICs in a more efficient manner that automatically accounts for network problems to enhance the system's performance. These concepts are described in greater detail with reference to FIGS. 1-4, below.

Figure 1:
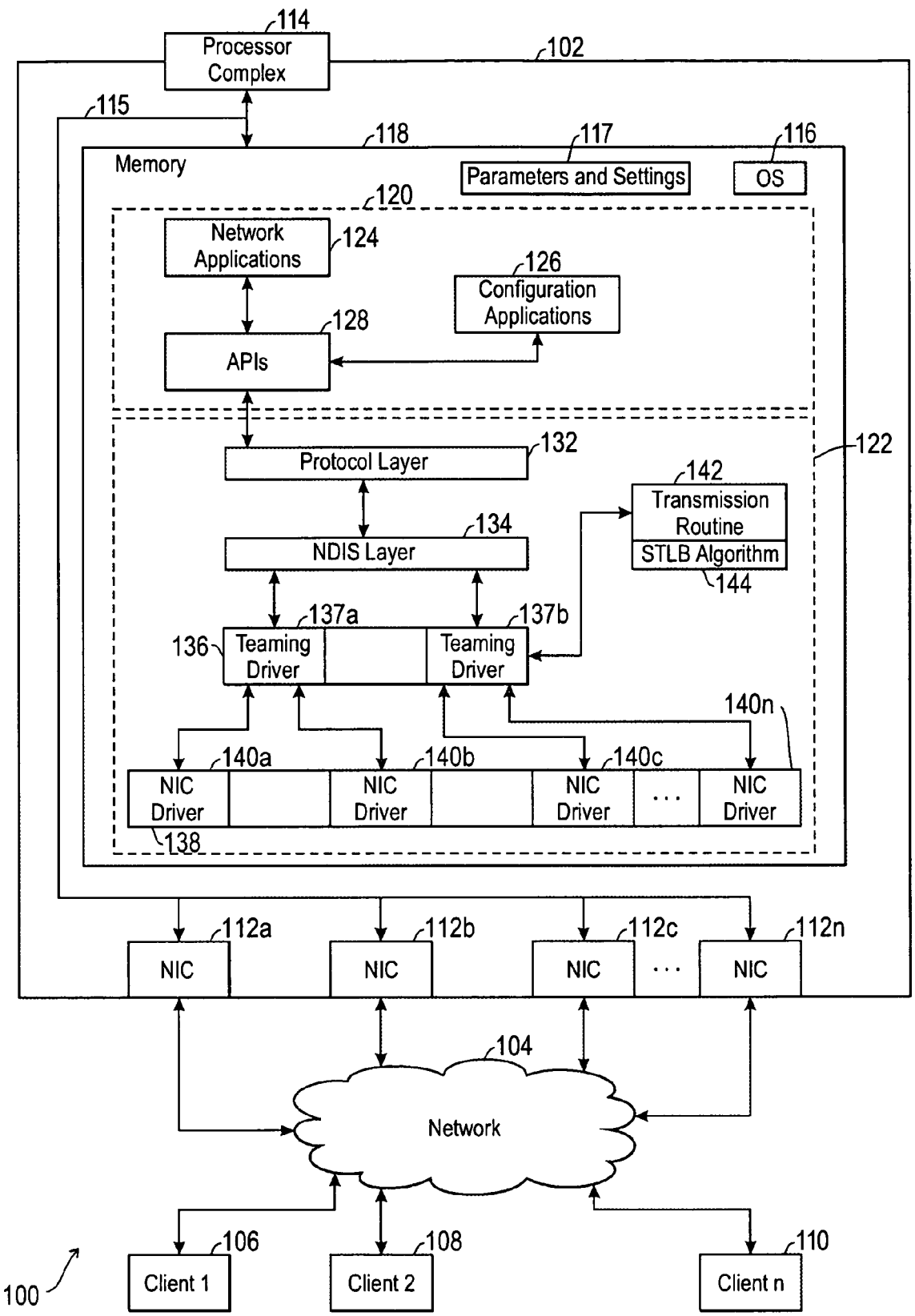
FIG. 1 is a block diagram illustrating a network in accordance with embodiments of the present invention.

Referring initially to FIG. 1, a block diagram of a network-based system 100 is illustrated. A computer system 102, which may be a server, database or other computer system, may be utilized with a network 104 to communicate with various client systems 106, 108 and 110. The computer system 102 may be connected to as many as "n" different client systems. The magnitude of "n" may be a function of the computing power of the computer system 102. Each of the client systems 106, 108 and 110 may be a functional client computer, such as a desktop personal computer (PC), a notebook PC, a tablet PC, a personal digital assistant (PDA), or the like.

The computer system 102 and client systems 106, 108 and 110 may communicate via a network 104, which may include a combination of hubs, switches, routers, or the like. While the network 104 may include a local area network (LAN), a wide area network (WAN), or a metropolitan area network (MAN), those skilled in the art will appreciate that the network 104 may assume other forms or may provide network connectivity through the Internet. For instance, the network may include different types of networks, such as ARCnet, Token Ring, FDDI, 10Base-T Ethernet, 100Base-T Ethernet, and/or 1000Base-T Ethernet network. As described below, the network 104 may also include other systems or servers, which may be dispersed geographically with respect to each other to support client systems 106, 108 and 110 in other locations.

Because the network 104 is a dynamic environment, a path through the network 104 may include different links, which are individual connections between network devices, as discussed in greater detail below with reference to FIG. 2. Accordingly, paths through the network 104 may vary depending on traffic loads, communication outages and other problems on the individual network links. Some of these problems may include a network link being disabled or disconnected between network devices, which may result in different paths having to be utilized through the network 104. Disadvantageously, the alternative path may provide a lower bandwidth. As a result, the communication between the computer system 102 and the client systems 106, 108 and 110 may be degraded.

The computer system 102 may utilize one or more network interface adapters. For example, the network interface adapters may be network interface cards (NICs) 112a-112n utilized to provide multiple access points to the network 104 for the computer system 102. By utilizing NICs 112a-112n, the computer system 102 may utilize different paths through the network 104 based on the respective path associated with the different NICs 112a-112n. Beneficially, the different NICs 112a-112n may improve the reliability, fault tolerance and increased throughput of the computer system 102 because information may be transmitted on any of the available paths of the different paths that are available to the computer system 102.

To manage the network access, the computer system 102 may form teams of two or more ports on the NICs 112a-112n to manage the interaction with the devices on the network 104, such as network switches and client systems 106, 108 and 110. Teaming of network interface resources is particularly common for servers because throughput and reliability problems may impact a large number of client systems 106, 108 and 110 relying on the servers to operate. The network resource teams typically include two or more ports (e.g. NICs 112a-112n) logically coupled in parallel to appear as a single virtual network adapter to the other devices on the network. While these NICs 112a-112n may be one or more single-port NICs, one or more multi-port NICs, and/or a combination thereof, single port NICs are described in the present application for exemplary purposes. Also, it should be noted that each of the NICs 112a-112n is coupled to the same logical grouping, which may include different types of network technologies, such as ARCnet, Token Ring, FDDI, 10Base-T Ethernet, 100Base-T Ethernet, and/or 1000Base-T Ethernet network. Accordingly, these network resource teams can provide aggregated throughput of data transmitted to and from the network 104 and/or fault tolerance (i.e. resource redundancy to increase reliability).

To operate in this manner, the computer system 102 may include one or more processors, such as the processor complex 114, which is utilized to operate the computer system 102. The processor complex 114 may communicate with the NICs 112a-112n, a memory 118, and other circuitry (not shown) via circuitry and various buses, which are generally referenced as bus 115. The processor complex 114 of the computer system 102 may utilize an operating system (OS) 116 to manage the interaction between the different hardware and software components to enable the components to work together. The OS 116 may be MS-DOS, Unix, Windows, Mac OS, and operating systems, which may be platform specific.

Because the processor complex 114 controls the functioning of the computer system 102, which is generally under the control of software programming, memory 118 is coupled to the processor complex 114 to store and facilitate the execution of software programs and routines. The memory 118 may include the system random access memory and/or the non-volatile RAM. The memory 118 may be used to store parameters, applications, drivers and/or data that may be utilized to facilitate control or to manage the operation of the computer system 102. For instance, the memory 118 may store parameters and settings 117 that are utilized to perform calculations within the computer system 102, as discussed below in FIGS. 2-4. Further, within the memory 118, a user environment 120 and an OS environment 122 may be utilized to manage the operation of the computer system 102.

In the user environment 120, applications, such as network applications 124 and/or configuration applications 126, perform specific functions or operations for the computer system 102. For instance, the network applications 124 may provide networking capabilities or access through the NICs 112a-112n. Further, the network applications 124 may be configured to utilize various applications and routines to support one or more network protocol stacks, such as Transmission Control Protocol/Internet Protocol (TCP/IP) stack, Internet Protocol exchange (IPX) stack, NETwork BIOS End User Interface (NETBUI) stack, and the like. These different protocols stacks may be utilized by the OS 116 to communicate the different protocols over the network 104. Also, the configuration applications 126 may be utilized to load drivers and install adapters for the NICs 112a-112n. Each of the applications 124 and 126 may utilize application-programming interfaces (APIs), such as APIs 128 for example, to interact with the OS environment 122. The APIs 128 are sets of rules for calling other software programs, applications, or drivers to facilitate the exchange of information within the computer system 102. Accordingly, the applications 124 and 126 may interact with other components or devices as directed by the OS 116 to perform specific functions or operations for the computer system 102 either directly or through the APIs 128.

In the OS environment 122, the OS 116 may be utilized to interact with the different hardware and software components, which enables the components to work together. Within the OS environment 122, the OS 116 may include a kernel that provides basic services to other parts of the OS 116 to operate several programs or applications (multi-tasking) and to provide the interconnection between other networks and/or peripheral devices. As such, in the OS environment 122, the OS 116 may manage the access to data, software components, and/or hardware components, which are discussed below.

As part of the OS environment 122, the OS 116 may include various layers 132, 134, 136 and 138 to maintain the associations of applications 124 and 126 with the NICs 112a-112n. These various layers 132, 134, 136 and 138 may each perform a distinct function, such as passing information between each other, the NICs 112a-112n, and the APIs 128, to enable communication with an operating system of another network device over the network 104. For example, if the OS 116 is Windows 2000, the layers may include a protocol layer 132, a network driver interface specification (NDIS) layer 134, an intermediate or teaming driver layer 136, and a miniport driver layer 138. The protocol layer 132 translates protocol addresses (i.e. layer 3 addresses) into MAC addresses (i.e. layer 2 addresses), while providing an interface between the network APIs 128 and the NDIS layer 134. The protocol layer 132 may specifically be configured to manage addresses for IP, IPX or NetBUI. The NDIS layer 134 handles communications between the underlying layers, such as the miniport driver layer 138 and/or teaming driver layer 136, and the protocol layer 132. The teaming driver layer 136 manages several miniport or NIC drivers 140a-140n within the miniport driver layer 138 to operate seamlessly as a single network adapter that interfaces with the NDIS layer 134. Further, the teaming driver 136 manages the load balancing of the transmitted traffic, which may be based on network information, such as Spanning Tree Bridge Protocol Data Units (STP BPDUs), received via the various NICs 112a-112n, as described further below. The miniport driver layer 138 is responsible for directly controlling the hardware, such as the NICs 112a-112n, via the respective NIC drivers 140a-140n. Accordingly, the miniport driver layer 138 may be represented by individual NIC drivers 140a-140n, which are each associated with a single NIC, such as NICs 112a-112n. These NIC drivers 140a-140n may be different drivers that are provided by the various vendors that provide the network adapter hardware.

To form the NICs 112a-112n into a team, an instance of a teaming driver, such as teaming drivers 137a and 137b, may be created and reside in the teaming driver layer 136 interposed between the miniport driver layer 138 and the NDIS layer 134. While each NIC 112a-112n may be assigned a protocol address at the miniport driver layer 138, the teaming driver layer 136 presents the group of NIC drivers 140a-140n as a single team with one NIC driver controlling a single NIC port. Accordingly, a single protocol address is typically assigned to each instance of the teaming drivers 137a and 137b. Thus, for each team of NICs 112a-112n, a separate instance of the teaming driver 137a or 137b at the teaming driver layer 136 may be present to manage the NIC drivers 140a-140n that correspond to the NICs 112a-112n associated with the team. For example, the teaming driver 137a may manage the NIC drivers 140a and 140b, which may be one team, while the teaming driver 137b may manage the NIC drivers 140c and 140n, which are part of a second team.

Because each instance of the teaming driver 137a and 137b can be used to combine two or more NIC drivers 140a-140n into a team, a user may configure multiple teams of any combination of the ports of the NICs 112a-112n installed into the computer system 102. The user may utilize the configuration applications 126, as discussed above, to form different teams. The teams may be formed to provide specific benefits, such as network fault tolerance (NFT) or transmit load balancing (TLB). For a NFT team, data may be transmitted and received through one of the two or more ports on the NICs 112a-112n to provide redundancy. Alternatively, for a TLB team, the data is transmitted through each of the two or more ports and received through at least one port of the NICs 112a-112n of the team. The TLB team may provide aggregated throughput of data transmitted to and from the network 104 via the network devices. Regardless of the implementation, the protocol layer 132 and NDIS layer 134 interact with the teaming driver instances 137a and 137b in the teaming driver layer 136 as if each is one logical device.

Sometimes NICs 112a-112n of the same NFT or TLB team may be connected between two or more separate network paths and a core switch of the network 104. This configuration may be utilized to further provide redundancy to the computer system 102. Accordingly, these separate network paths have different network links between the network devices that may limit the bandwidth available on the different paths. As such, a "path cost" may be associated with each network path that includes the total cost associated with the individual network links utilized in the network path. The path cost is associated with the relative throughput (e.g. the lower the throughput of a given path, the greater the path cost). Path cost may be defined as the summation of the cost of each link between a device and the root switch. For example, if device A has three links (Link A, Link B, and Link C) between it and the root switch, device A's path cost is the sum of the cost of Link A plus Link B plus Link C. The cost associated with a particular link is used by the Spanning Tree algorithm to choose the best path to use when multiple paths are available.

To transmit the data, the teaming drivers 137a and 137b may access a transmission routine 142. The transmission routine 142 may employ various algorithms that load balance network traffic through the two or more NICs 112a-112n. The transmission algorithm 142 may enable the computer system 102 to utilize multiple NICs 112a-112n, when a single NIC would be limited by the specific wire speed of the connection to the network 104 or have the throughput diminish because the connection to the network 104 is saturated. That is, the transmission routine 142 may be utilized to perform load balancing on the transmission of packets from the NICs 112a-112n in a specific team. The transmission routine 142 may load balance the transmission of packets based on a round robin approach, manual settings, or a statistical algorithm that includes the bandwidth of the NICs 112a-112n.

However, because of the dynamic nature of networks, the transmission routine 142 may not be able to adjust to network problems, such as traffic loads, communication outages and other problems on the individual network links. Indeed, as noted above, the use of an alternative path may include a poorer quality path that provides lower bandwidth, which degrades access to and the performance of the computer system 102. For example, if a network link between a switch and the core switch is disabled, the network path may switch to a network path that includes multiple additional network links. The new network path may increase the path cost associated with the network path. The conditions can also change as network devices and/or transmission media are added or replaced.

To compensate for network problems, the transmission routine 142 may utilize network information to adjust for changes in the path costs associated with the individual NICs 112a-112n. For example, the transmission routine 142 may include a spanning tree path cost load-balancing (STLB) algorithm 144. Generally, "Spanning Tree" refers to a link management protocol that provides path redundancy while preventing undesirable loops in a network. For the network to function properly, at any given time, only one active path should exist between network devices. Multiple active paths between devices cause loops in a network. If a loop exists in the network topology, the potential exists for duplication of messages. To provide path redundancy, Spanning-Tree Protocol (STP) defines a tree that spans all switches in an extended network. Spanning-Tree Protocol forces certain redundant data paths into a standby (blocked) state. If one network segment in the Spanning-Tree Protocol becomes unreachable, or if Spanning-Tree Protocol costs change, the spanning-tree algorithm (STLB algorithm 144) reconfigures the network topology and reestablishes the link by activating the standby path.

The STLB algorithm 144 may utilize spanning tree bridge protocol data unit (BPDU) frames or packets that are provided from each NIC 112a-112n to the teaming driver 137a and 137b. Each NIC 112a-112n receives the BPDU frames or packets containing networking information from the directly attached switch or bridge. The BPDU packets carry information about the cost of the respective link to a core network device, called a root switch or bridge by Spanning Tree-aware devices. The STLB algorithm 144 utilizes this information to either select the NIC 112a-112n with the best path cost (i.e. highest bandwidth) to the core of the network 104 or to allocate the transmission packets to the NICs 112a-112n based on network information.

Beneficially, the use of the network information by the teaming drivers 137a and 137b enhances the reliability and throughput of the computer system 102 because the teaming drivers 137a and 137b dynamically adjust for network problems or conditions. For instance, the teaming drivers 137a and 137b may automatically adjust the allocation of transmission packets based on information received from the network 104 regarding the path cost of the various NICs 112a-112n without manual intervention. That is, the teaming drivers 137a and 137b may dynamically change transmission allocations without user intervention if the network topology changes. An exemplary embodiment of the use of a teaming driver, which provides the load balancing functionality in accordance with aspects of the present techniques, is described further in FIG. 2.

Figure 2:
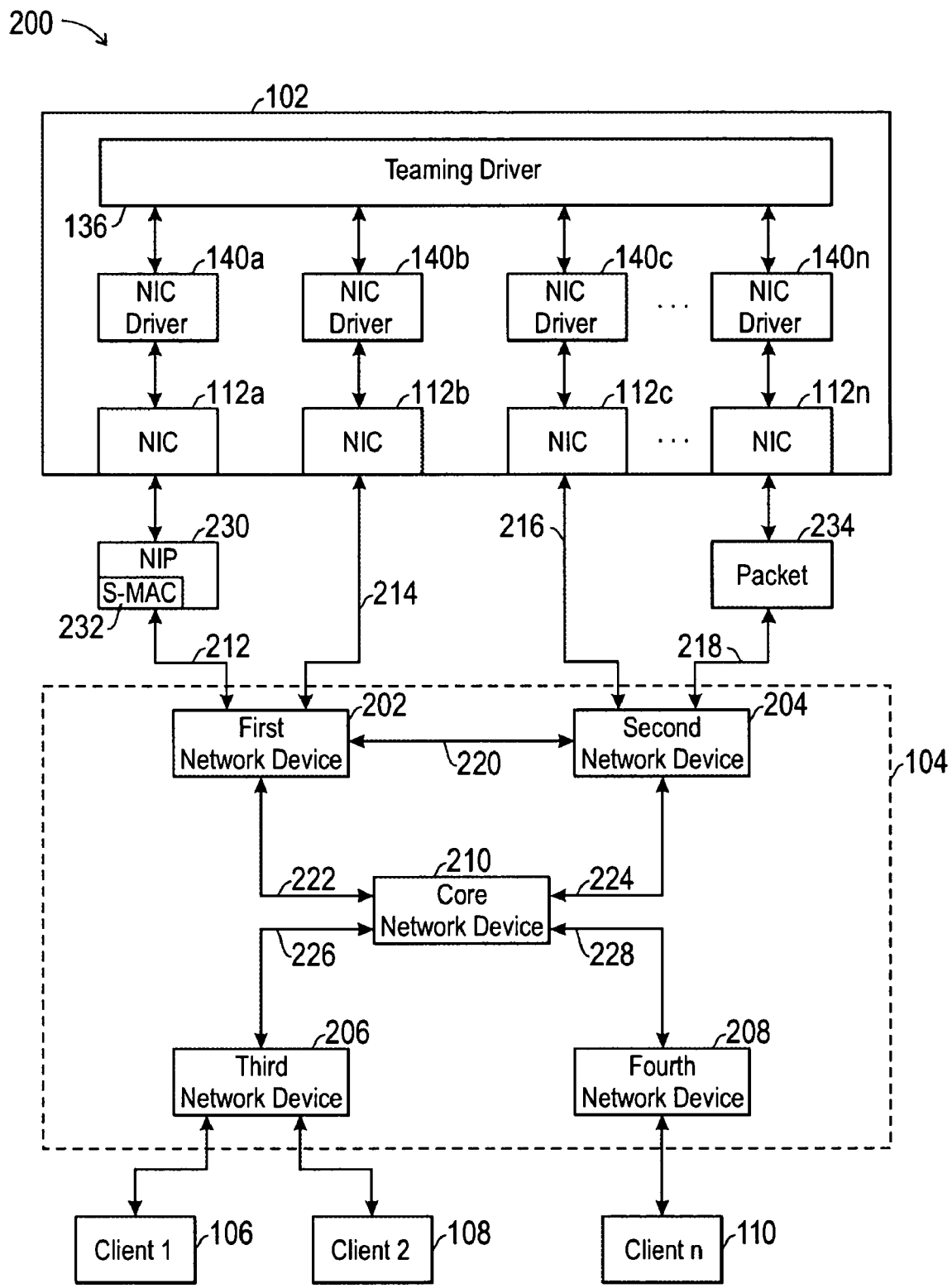
FIG. 2 is a block diagram of an exemplary network and a simplified embodiment of the computer system of FIG. 1 in accordance with an embodiment of the present invention.

FIG. 2 is a block diagram, which is designated by a reference numeral 200, of an exemplary network and a simplified embodiment of the computer system of FIG. 1 in accordance with an embodiment of the present invention. In this embodiment, the teaming driver 136, which may be one of the instances of the teaming drivers 136a and 136b of FIG. 1, manages the NIC drivers 140a-140n and NICs 112a-112n, as discussed above. The teaming driver 136 communicates with network devices, such as a first network device 202, a second network device 204, a third network device 206, a fourth network device 208, and a core network device 210, via the NICs 112a-112n. The network devices 202, 204, 206, 208 and 210 may include bridges, routers, switches, firewalls, and/or other network hardware systems. By communicating with these network devices 202, 204, 206, 208 and 210, the teaming driver 136 may receive network information packets, such as network information packets 230, which are utilized to dynamically adjust the allocation of transmission packets 234 from the team of NICs 112a-112n.

In the diagram 200, the network devices 202, 204, 206, 208 and 210 may be interconnected via various links to provide communication paths between the computer system 102, the network devices 202, 204, 206, 208 and 210, and the client systems 106, 108 and 110. The network links may be the individual connections between the computer system 102, the network devices 202, 204, 206, 208 and 210, and the client systems 106, 108 and 110. The network paths include a group of network links that are combined together to form a continuous communication path from one device, such as the computer system 102, to another device, such as the core network device 210. As an example, the first network device 202 may be coupled to the NIC 112a via a first system link 212, coupled to the NIC 112b via a second system link 214, coupled to the second network device 204 via a switch link 220, and coupled to the core network device 210 via a first core link 222. The second network device 204 may be coupled to the NIC 112c via a third system link 216, coupled to the NIC 112n via a fourth system link 218, and coupled to the core network device 210 via a second core link 224. The core network device 210 may also be coupled to the third switch via a third core link 226 and coupled to the fourth network device 210 via a fourth core link 228.

In this exemplary embodiment, each of the NICs 112a-112n is associated with the teaming driver 136 and is located in the same logical grouping from the layer 2 perspective of the OSI (Open Systems Interconnection) Basic Reference Model. That is, the NICs 112a-112n operate in the same domain or subnet with respect to each other. While these NICs 112a-112n are in the same logical group, the links to the network may include different types of physical media, such as fiber optics, copper, or coaxial cable, and/or even different bandwidths based on the network technology, such as ARCnet, Token Ring, FDDI, 10Base-T Ethernet, 100Base-T Ethernet, and/or 1000Base-T Ethernet network. As a result, the different NICs 112a-112n may have different network links that provide different bandwidths.

Further, because the network 104 may be complex, network information may be exchanged between the network devices 202, 204, 206, 208 and 210 to manage the traffic flow on the network 104. This network information is typically generated as data defining a cost for each network link in an associated network path. The cost is inversely related to the bandwidth of the connection (i.e. the cost value is lowest for those connections with the highest bandwidth and vice versa). This cost may be provided in a network information packet 230 that is exchanged between the computer system 102 and the network devices 202, 204, 206, 208 and 210 via the NICs 112a-112n. For example, the network information packet 230 may be a Bridge Protocol Data Units (BPDU) packet or frame, which is base on the Spanning Tree protocol that is specified under ANSI/IEEE Std 802.1D (the entirety of which is incorporated herein by this reference). Each BPDU packet includes the cost information for an individual path that is provided for each of the NICs 112a-112n. As a result, the cost of a specific path includes the cumulative cost for each of the individual network links between the computer system 102 and the core network device.

In the present embodiment, the teaming driver 136 utilizes an address to receive the Spanning Tree cost information in accordance with the 802.1D specification. This address is a special multicast MAC (media access control) address 232 that is utilized by the teaming driver 136 to load balance the transmission of packets, such as the transmission packets 234, from the various NICs 112a-112n that are part of the team. With the path cost information extracted the network information packet 230, the teaming driver 136 may compare the path costs to the core network device for each of the NICs 112a-112n. Then, the teaming driver 136 may utilize the STLB algorithm 144 (FIG. 1) directly or through the transmission routine 142 (FIG. 1) to load balance the allocation of transmission packets 234 from the different NICs 112a-112n. Accordingly, whenever a change in the path costs is detected from the network information packet 230, the teaming driver 136 may reallocate the distribution of transmission packets 234 for each of the NICs 112a-112n.

As a specific example, the links 212-228 may each be configured as a 100Base-T Ethernet connection and the teaming driver 136 may manage the NICs 112a-112n as a single team. Accordingly, the network path for the NIC 112a is through the first system link 212 and the first core link 222, while the network path for the NIC 112b is through the second system link 214 and the first core link 222. Similarly, the network path for the NIC 112c is through the third system link 216 and the second core link 224, while the network path for the NIC 112n is through the fourth system link 218 and the second core link 224. With each of the links operating at 100Base-T, the teaming driver 136 may transmit the packets in a round robin manner because the path cost for each of the paths is set to 38 (i.e. 19 for each link of 100 Mbps) or another predefined value for the specific bandwidth. In accordance with the ANSI/IEEE Std 802.1D, any link operating at 100 Mb is assigned a cost of 19. Devices operating at 10 Mb are assigned a cost of 100. Gigabit Ethernet devices are assigned a cost of 4. As will be appreciated, other standards and costs may be associated with the particular paths, in accordance with various operating speeds.

However, if the second core link 224 is disabled or disconnected, the path cost for the NICs 112a and 112b increases by 19 because the new alternative path is through three links, which are the respective system links 212 and 214, the switch link 220 and the second core link 224. Accordingly, in this configuration, the network information packets 230 are transmitted to the associated NICs 112a-112n with network information that accounts for the disabled link. This network information provides the teaming driver 136 with the updated path cost information for each of the NICs 112a-112n, which is utilized to reallocate the distribution of transmission packets 234 via the NICs 112a-112n. Unlike previous systems, the teaming driver 136 may be configured to adjust the transmission allocation between the NICs 112a-112n based on dynamic network conditions without manual user intervention. The calculation of the weights utilized in the STLB algorithm 144 is shown in greater detail in FIG. 3.

Figure 3:
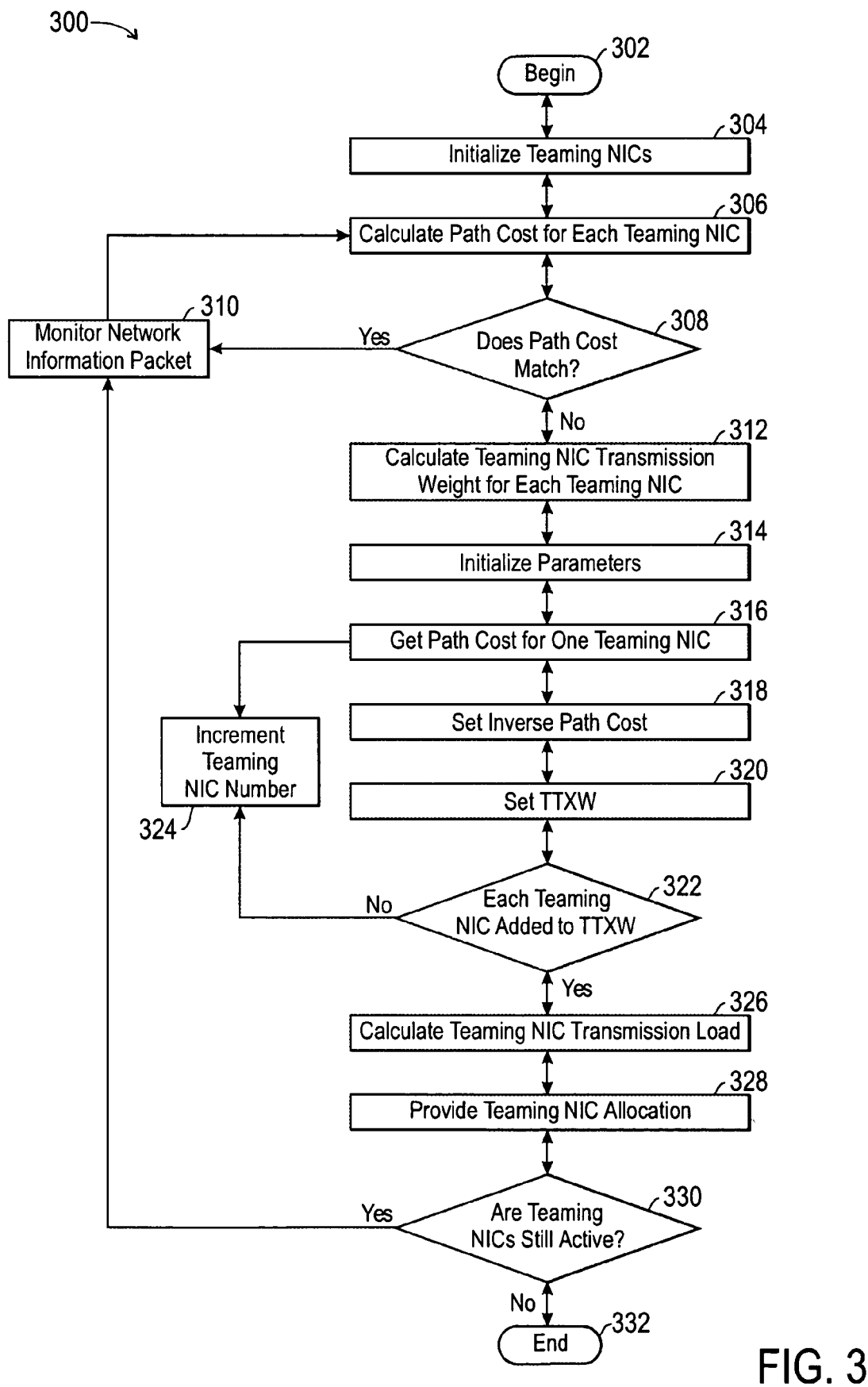
FIG. 3 is a process flow diagram illustrating an exemplary calculation of different weights applied to the teaming NICs of the computer system of FIG. 1 in accordance with embodiments of the present invention.

FIG. 3 is a process flow diagram illustrating an exemplary calculation of the weights applied to each of the teaming NICs of FIG. 1 in accordance with embodiments of the present invention. The process is generally referred to by the reference numeral 300. To understand this flow diagram, it may be best understood by concurrently viewing FIGS. 1-2. In this diagram 300, the teaming driver 136 may monitor network information packets 230 for path cost information. With the path cost information, the teaming driver 136 may calculate a weight for each the teaming NICs 112a-112n to allocate transmission packets 234 in a load balanced manner.

The process begins at block 302. At block 304, the teaming driver 136 may initialize each of the teaming NICs 112a-112n. The initialization may include setting the weighted value and path cost (PC) for each of the teaming NICs 112a-112n to a predefined value or an equal distribution value, which may be stored in memory 118 within the computer system 102. At block 306, the teaming driver 136 may calculate the path cost for each link. This calculation may be based on the spanning tree path cost to the network core, which is based on the network information packets 230 received from the switches 202 and 204. At block 308, the teaming driver 136 may compare the path costs for each of the teaming NICs 112a-112n with the previously stored values for each of the teaming NICs 112a-121n. If the path cost for each of the teaming NICs 112a-112n matches the previously stored value, then teaming driver 136 may continue to monitor the network information packets 230, as shown in block 310. Then, once other network information packets 230 are received, the teaming driver 136 may calculate again the path cost for each of the teaming NICs 112a-112n, as shown in block 306.

However, if the path cost for each of the teaming NICs 112a-112n does not match the previously stored value, then teaming driver 136 may calculate the weighted values for each of the teaming NICs 112a-112n, as shown in blocks 312-324. To begin, the teaming driver 136 may calculate the teaming NIC transmission weights (TNXWs) for each of the teaming NICs 112a-112n, as shown in block 312. TNXW, as assigned to an individual Teaming NICs 112a-112n, is defined as an individual Teaming NIC's 112a-112n percent of the total transmission load for the Teaming driver 136. The TNXW for each Teaming NICs 112a-112n may change as the path cost changes, number of valid/usable Teaming NICs 112a-112n exist in the Teaming driver 136 to share the transmission load, etc. At block 314, the teaming driver 136 may initialize the parameters utilized in calculating the weighted values for the teaming NICs 112a-112n. The initialization of the parameters may include setting the values of various parameters, such as inverse path cost (IPC), total transmission weight (TTXW), team NIC number and/or teaming NIC transmission load (TNXL), to "0" or other initial value. Once the parameters have been initialized, the path cost associated with the team NIC number may be accessed from memory 118, as shown in block 316. At block 318, the inverse path cost may be set to a specific value. The IPC value is defined as the inverted path cost or a value that represents a better path the higher the value which is inversely proportional to the normal path cost where a lower value represents a better path. By converting the Path Cost to an inverted Path Cost, multiple path costs can be added together to be used in other calculations. For instance, the inverse path cost may be defined by the following equation:

$$IPC=100/(PC/100)$$

Then, the total transmission weight (TTXW) may be set to a specific value, as shown in block 320. TTXW is defined as the sum of the inverted Path costs for all teaming NICs 112a-112n. The total transmission weight may be defined by the following equation:

$$TTXW=TTXW+IPC$$

At block 322, the teaming driver 136 may determine if all of the teaming NICs 112a-112n are added to the total transmission weight. If all of the teaming NICs 112a-112n are not added to the total transmission weight, then the teaming NIC number may be incremented to the next teaming NIC, as shown in block 324. Once the teaming NIC number is incremented, the next teaming NIC may be added to the weight calculations, as shown in blocks 316, 318 and 320. However, if all of the teaming NICs 112a-112n are added to the total transmission weight, then the teaming NIC transmission load (TNXL) may be calculated for each of the teaming NICs 112a-112n, as shown in block 326. TNXL for any single one of the Teaming NICs 112a-112n is defined as the single Teaming NIC's assigned number of frames per 100 frames that the Teaming NIC will transmit for the Teaming driver 136. Teaming NICs with a higher assigned TNXL value will transmit more frames per 100 frames than Teaming NICs with a lower assigned TNXL value. The teaming NIC transmission load may be defined by the following equation:

$$TNXL=TNXW/TTXW*100 \text{(rounded to nearest whole integer)}$$

It should be noted that the teaming driver 136 does not utilize any of teaming NICs 112a-112n with a teaming NIC transmission load weight of zero to transmit packets.

Once the teaming NIC load weights are calculated for each of the teaming NICs 112a-112n, the teaming NIC load weights may be stored into memory 118, as shown in block 328. In particular, the teaming NIC load weights may be stored in a register or other location that may be utilized to dynamically adjust the teaming NIC load weights. At block 330, the teaming driver 136 may determine if the teaming NICs 112a-112n are still active. If the teaming NICs 112a-112n are active, then the teaming driver 136 may continue to monitor the network information packets, as discussed above in block 310. However, if the teaming NICs 112a-112n are not active, the process may end at block 332. The use of the weighted calculations per teaming NIC are discussed further in FIG. 4.

Figure 4:
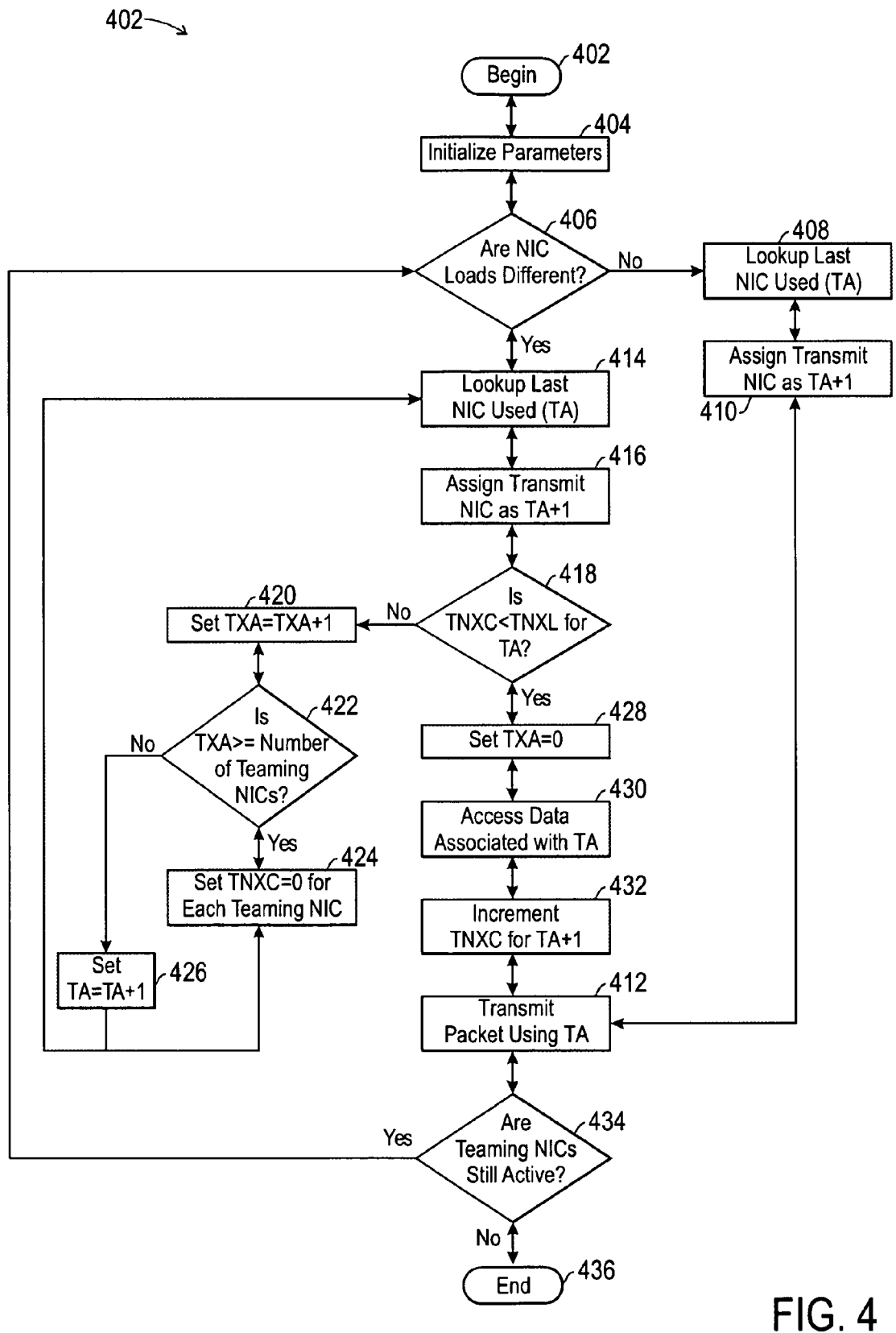
FIG. 4 is a process flow diagram illustrating an exemplary calculation of the load balancing transmission algorithm applied to each of the teaming NICs of the computer system of FIG. 1 in accordance with embodiments of the present invention.

FIG. 4 is a process flow diagram illustrating an exemplary calculation of the load balancing transmission algorithm that is applied to each of the teaming NICs in the computer system 102 of FIG. 1 in accordance with embodiments of the present invention. The process is generally referred to by the reference numeral 400. To understand the flow diagram of FIG. 4 may be best understood by concurrently viewing it along with FIGS. 1-2. In the diagram 400, each the teaming NICs 112a-112n may be utilized to transmit packets 234 in a load balanced manner based on network information, as discussed above.

The process begins at block 402. At block 404, the teaming driver 136 may initialize the parameters utilized to load balance transmissions from the teaming NICs 112a-112n. The initialization of the parameters may include setting the values of various parameters, such as teaming NIC transmission count (TNXC) and/or transmission attempt (TXA), to "0" or other initial value. At block 406, the teaming driver 136 may determine if the teaming NIC loads (NL) are different for each of the teaming NICs 112a-112n. NL is defined as the same value per individual Teaming NIC as the TXNL value per individual Teaming NIC. If the teaming NIC loads are the same, indicating equal load balancing across all Teaming NICs 112a-112n, then the teaming driver 136 may lookup the last teaming NIC utilized to transmit a frame (TA), as shown in block 408. At block 410, the teaming driver 136 may assign the transmission teaming NIC to the next teaming NIC (TA+1). The next teaming NIC may be selected based on a round robin selection or a list that includes each of the teaming NICs 112a-112n. Then, the teaming driver 136 may transmit the packet 234, as shown in block 412. The transmission of the packet may involve utilizing the NIC drivers 140a-140n and NICs 112a-112n, as discussed above.

However, if the teaming NIC load weights (TXNL) are different, the teaming driver 136 may utilize the spanning tree path cost load balancing algorithm to load balance the allocation of transmission packets 234, as shown in blocks 414-432. At block 414, the teaming driver 136 may lookup the last teaming NIC utilized to transmit a frame (TA). At block 416, the teaming driver 136 may assign the transmission teaming NIC to the next teaming NIC (TA+1). The next teaming NIC may be selected based on a round robin selection or a list that includes each of the teaming NICs 112a-112n. At block 418, the teaming driver 136 may determine if the teaming NIC transmission count (TNXC, which is defined as the total number of frames the Teaming NIC has transmitted since the TNXC value was last reset) is less than the teaming NIC transmission load (TNXL) for the transmission teaming NIC (TA+1). Valid values for the teaming NIC transmission count may be in the range of 0 to less than or equal to TXNL. The TNXC value is used to count the number of frames a Teaming NIC has transmitted until the Teaming NIC has reached its TNXL. Once TNXC is equal to or greater than TNXL, the Teaming NIC has finished transmitting its assigned number of frames for the Teaming driver 136.

If the teaming NIC transmission count is less than the teaming NIC transmission load for the transmission teaming NIC (TA+1), then the teaming driver 136 may determine if each of the teaming NICs 112a-112n has been utilization, as shown in blocks 420-426. At block 420, the transmission attempt may be incremented or set to a specific value. For instance, the transmission attempt may be incremented by a value of "1." Then, the teaming driver 136 may determine if the transmission attempt is greater than or equal to the number of teaming NICs 112a-112n, as shown in block 422. If the transmission attempt is greater than or equal to the number of teaming NICs 112a-112n, then the teaming driver 136 may have the NIC transmission count set to an initial value, such as "0," for each of the teaming NICs 112a-112n, as shown in block 424. However, if the transmission attempt is less than the number of teaming NICs 112a-112n, then the transmission attempts may be incremented, as shown in block 426. Following the blocks 424 and 426, the teaming driver 136 may assign the transmission teaming NIC to the next teaming NIC (TA+1), as discussed above in block 414.

However, if the teaming NIC transmission count is greater than or equal to the teaming NIC transmission load for the transmitting teaming NIC (TA+1), then the teaming driver 136 may utilize the teaming NIC to transmit packets, as shown in blocks 428-432. To begin, the teaming driver 136 may set the transmission attempts parameter to an initial value, such as "0," as shown in block 428. At block 430, the teaming driver 136 may access data associated with the teaming NIC that is currently set as the transmission teaming NIC. Further, the teaming driver 136 may increment the port transmission count by a set value, such as "1," as shown in block 432. Then, the teaming driver 136 may transmit the packet, as discussed above and shown in block 412.

Once the packet has been transmitted, the teaming driver 136 may determine if the teaming NICs 112a-112n are still active, as shown in block 434. If the teaming NICs 112a-112n are active, then the teaming driver 136 may lookup the last NIC used, as discussed above in block 414. However, if the teaming NICs 112a-112n are not active, the process may end at block 436.

Further, it should be noted that the teaming drivers 136a and 136b may be associated with individual ports for NICs 112a-112n that include two or more ports. For example, if each of the NICs 112a-112n includes two ports, then the teaming driver 136a may be associated with the first port for each of the NICs 112a-112n, while the teaming driver 136b may be associated with the second port on each of the NICs 112a-112n. Accordingly, the calculations may then be based on the individual ports not the NIC as a whole.

Many of the steps of the exemplary processes described above with reference to FIGS. 3 and 4 comprise an ordered listing of executable instructions for implementing logical functions. The ordered listing can be embodied in a computer-readable medium for use by or in connection with a computer-based system that can retrieve the instructions and execute them to carry out the previously described processes. In the context of this application, the computer-readable medium can be a means that can contain, store, communicate, propagate, transmit or transport the instructions. By way of example, the computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette, a random access memory (RAM) a read-only memory (ROM), an erasable programmable read-only memory (EPROM or Flash memory), an optical fiber, and a portable compact disk read-only memory (CDROM). It is even possible to use paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims

What is claimed is:

1. A system comprising:
at least two network interface adapters configured to:
couple to a network; and
receive network information packets from the network;
a teaming driver associated with the at least two network interface adapters, the teaming driver configured to:
monitor the network information packets for a path cost for each of the at least two network interface adapters, wherein the path cost is an accumulation of predefined values assigned each link in a network path, the predefined values corresponding to a bandwidth for each link in the network path, the path cost changing only if the number of links in the network path changes;
calculate weights for each of the at least two network interface adapters based on the network information packets; and
generate a transmission allocation for distributing outgoing packets between the at least two network interface adapters based on the calculated weights.

2. The system set forth in claim 1, wherein each of the path costs comprises a path cost to a core network device from one of the at least two network interface adapters.

3. The system set forth in claim 1, comprising a transmission routine accessible to the teaming driver to calculate the weights for each of the at least two network interface adapters and generate the transmission allocation for distributing outgoing packets between the at least two network interface adapters.

4. The system set forth in claim 1, comprising a spanning tree path cost load balancing algorithm utilized by the teaming driver to calculate the weights for each of the at least two network interface adapters.

5. The system set forth in claim 1, wherein the network information packets comprise spanning tree bridge protocol data unit frames that carry information about the path cost for each of the at least two network interface adapters to a core network device.

6. The system set forth in claim 1, wherein the teaming driver is configured to automatically update the transmission allocation based on the network information packets.

7. The system set forth in claim 1, wherein the teaming driver is configured to dynamically adjust the transmission allocation based on changes in the network that are provided in the network information packets.

8. The system set forth in claim 1, wherein the at least two network interface adapters are coupled to the same logical grouping in a layer 2 network.

9. The system set forth in claim 1, wherein the at least two network interface adapters comprise network interface cards.

10. A network comprising:
a plurality of systems;
a network that connects the plurality of systems; and
wherein at least one of the plurality of systems comprises:
a plurality of network interface adapters coupled to the network; and
a teaming driver internal to the at least one of the plurality of systems and associated with the plurality of network interface adapters, the teaming driver configured to:
monitor a plurality of network information packets that include a path cost for one of the plurality of network interface adapters through the network to a core network device, wherein the path cost is an accumulation of predefined values assigned to each link in a network path, the predefined values assigned based on a bandwidth for each link in the network path, the path cost changing only if the number of links in the network path changes;
compare the path costs with previously stored values;
if the path costs matches the previously stored values then continue to monitor; and
if the path costs do not match the previously stored values, then calculate for each of the plurality of network interface adapters a transmission weight that is based on the received path cost for each that network interface adapter; and
allocate a plurality of packets for transmission via the network to each of the plurality of network interface adapters based on the calculated transmission weights.

11. The network set forth in claim 10, wherein the network comprises a layer 2 network.

12. The network set forth in claim 10, wherein the plurality of network interface adapters is coupled to the same logical grouping in a layer 2 network.

13. The network set forth in claim 10, wherein the teaming driver is configured to dynamically adjust the transmission allocation based on network conditions indicated in the network information packets.

14. The network set forth in claim 10, comprising:
a first network device coupled to at least a first network interface adapter of the plurality of network interface adapters;
a second network device coupled to at least a second network interface adapter of the plurality of network interface adapters;
the core network device coupled to the first and second network devices.

15. The network set forth in claim 14, wherein the first network device provides the path cost information for the first network interface adapter of the plurality of network interface adapters from the core network device and the second network device provides the path cost information for the second network interface adapter of the plurality of network interface adapters from the core network device.

16. The network set forth in claim 10, wherein the teaming driver is configured to dynamically adjust the allocation of the plurality of packets for transmission based on changes in the network provided in the network information packets.

17. The system set forth in claim 10, wherein the plurality of network interface adapters comprises a plurality of network interface cards.

18. A method of load balancing a plurality of paths between a system and a core network device, the method comprising:

- monitoring by a teaming driver a plurality of network information packets from a layer 2 network for network conditions;
- determining a transmission weight for each of a plurality of network interface adapters based on the network conditions, wherein the transmission weight is determined by an accumulation of fixed cost values assigned to each link in a network path based on a specific bandwidth for each link in the network path, the transmission weight changing only if the number of links in the network path changes; and
- allocating a plurality of transmission packets to each of the plurality of network interface adapters based on the transmission weights for respective ones of the plurality of network interface adapters.

19. The method of claim 18, wherein monitoring comprises accessing a path cost for each of the plurality of paths from each of the plurality of network interface adapters to a core network device.

20. The method of claim 18, wherein the determining the transmission weight comprises utilizing the provided path cost for each of the plurality of network interface adapters to calculate transmission weights that are load balanced based on the path costs for respective ones of the plurality of network interface adapters.

21. The method of claim 18, wherein the allocating the plurality of transmission packets comprises dynamically adjusting the allocation based on changes in the network that are provided in the network information packets.

22. The method of claim 18, comprising forming a team of the plurality of network interface adapters coupled to the same logical grouping in the layer 2 network.

23. A non-transitory computer-readable electronic storage medium storing instructions for:

- monitoring a plurality of network information packets from a layer 2 network for a path cost for each of a plurality of network interface adapters, the path cost being an accumulation of predefined values assigned to each link in a path of the layer 2 network based on a bandwidth for each link, the path cost changing only if the number of links in the path of the layer 2 network changes;
- determining a transmission weight for each of the plurality of network interface adapters based on the path cost; and
- allocating a plurality of transmission packets to each of the plurality of network interface adapters based on the transmission weights for respective ones of the plurality of network interface adapters.

* * * * *

UNITED STATES PATENT AND TRADEMARK OFFICE
CERTIFICATE OF CORRECTION

| | | |
|---|---|---|
| PATENT NO. | : 7,876,689 B2 | Page 1 of 1 |
| APPLICATION NO. | : 11/171297 | |
| DATED | : January 25, 2011 | |
| INVENTOR(S) | : Michael Sean McGee | |

It is certified that error appears in the above-identified patent and that said Letters Patent is hereby corrected as shown below:

In column 14, line 65, in Claim 14, after "adapters;" insert -- and --.

Signed and Sealed this
Nineteenth Day of April, 2011

David J. Kappos
*Director of the United States Patent and Trademark Office*